Oct. 19, 1971  S. B. REEVES  3,613,341
NUT HARVESTER

Filed April 10, 1970  3 Sheets-Sheet 1

INVENTOR.
SAM B. REEVES
BY Polachek & Saulsbury
ATTORNEYS

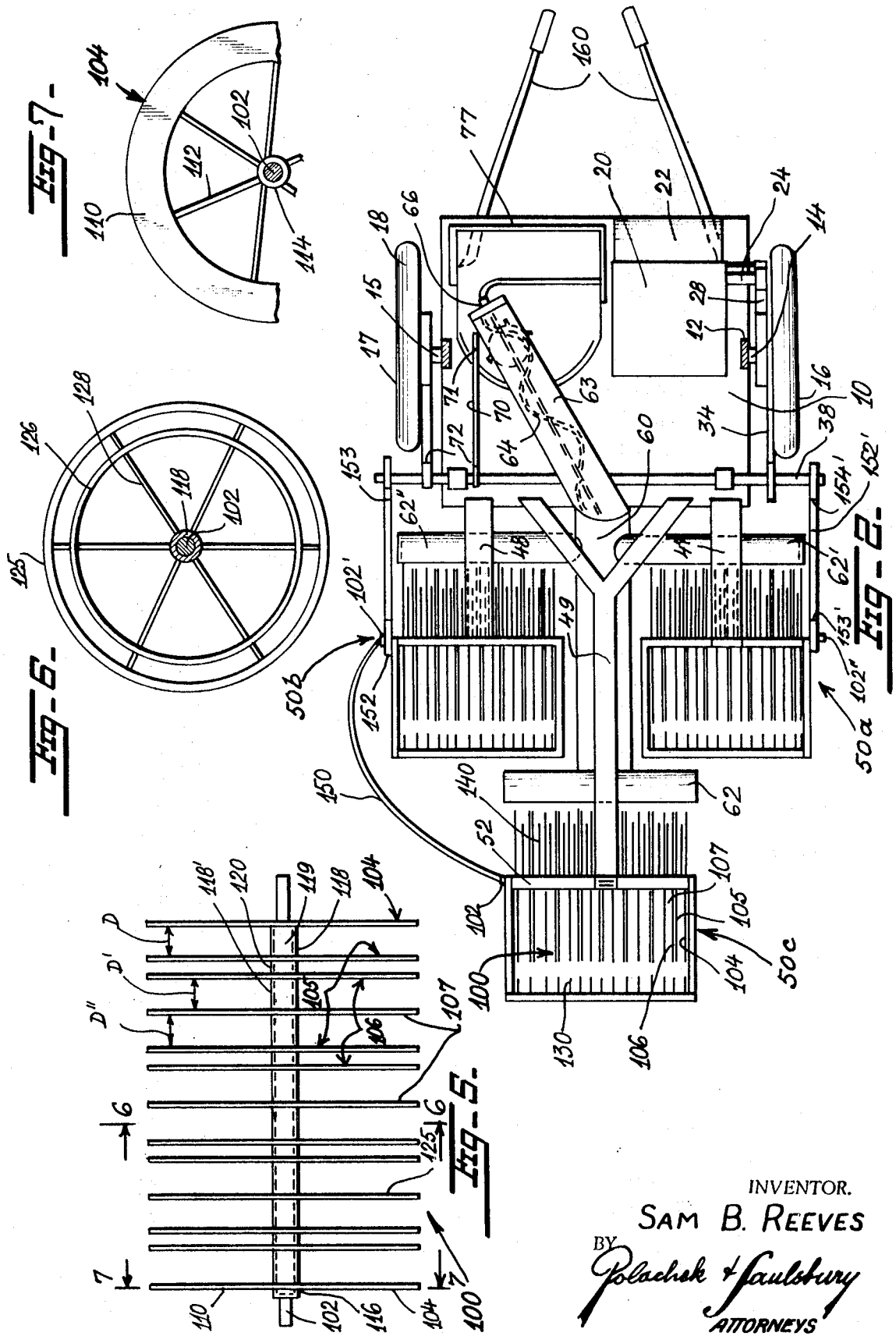

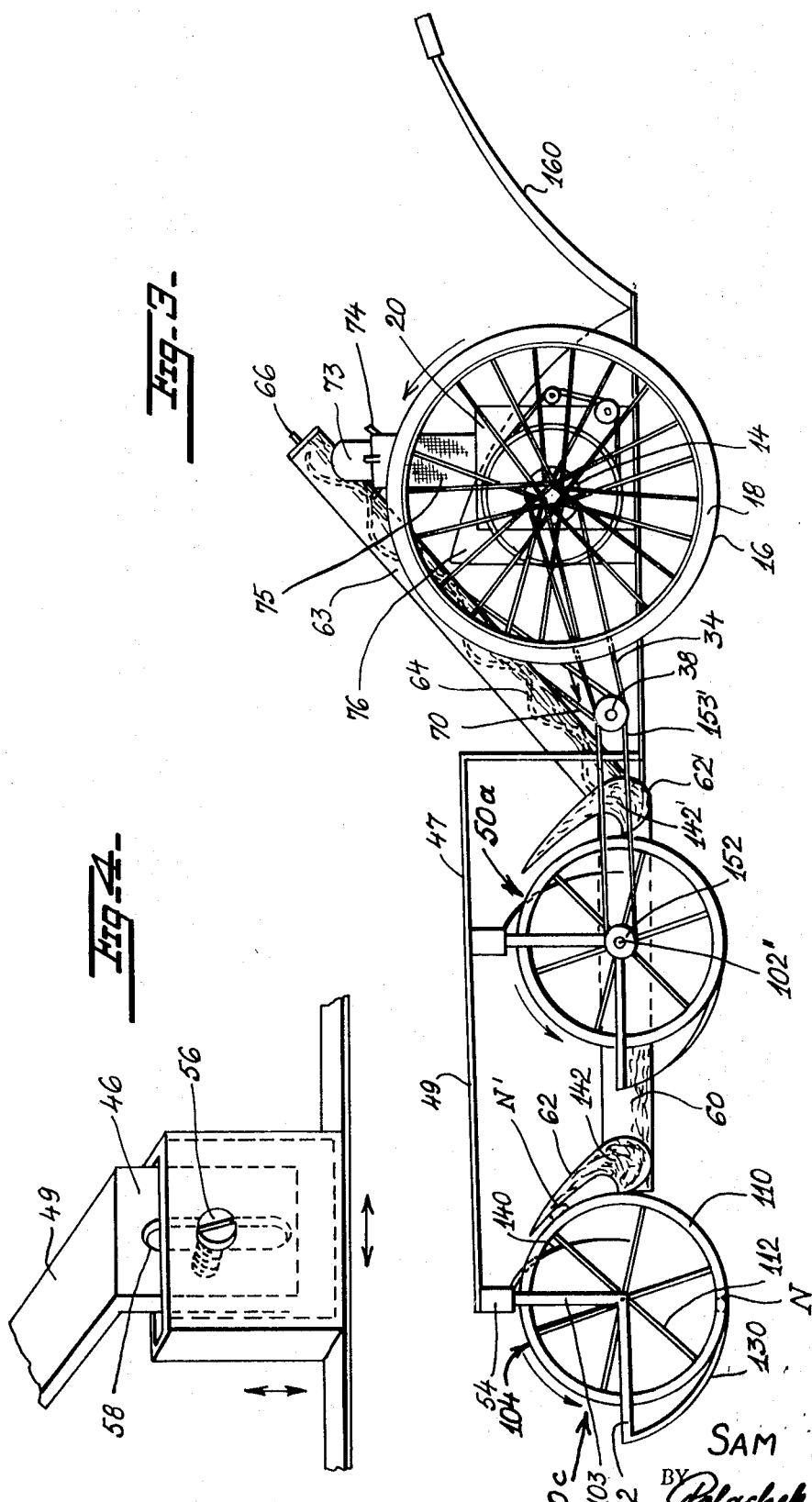

United States Patent Office 3,613,341
Patented Oct. 19, 1971

3,613,341
NUT HARVESTER
Sam B. Reeves, 2323 Cherry St.,
Montgomery, Ala. 36107
Filed Apr. 10, 1970, Ser. No. 27,315
Int. Cl. A01d *51/00*
U.S. Cl. 56—328                    9 Claims

ABSTRACT OF THE DISCLOSURE

A nut harvester machine includes a carriage for advancing along a ground surface from which nuts are to be gathered. A conveyor is carried by the carriage to pass picked up nuts to a receptacle. A framework is mounted on the carriage. One or more nut gathering units are connected to the framework and conveyor to pick up nuts from the ground. Each unit includes an assembly of spaced tines which align nuts on the ground for engagement between laterally spaced flexible supported wheels. Other tines expel the nuts into a trough connected to the conveyor means. A motor on the carriage may be arranged to drive the carriage, nut gathering unit and conveyor.

---

This invention concerns a hand guided motorized nut harvester movable over a ground surface for gathering nuts which have fallen from trees and are lying on the ground.

Prior nut gathering machines have generally been large and cumbersome, requiring consumption of large amounts of power for their operation. Such machines are so large that they do not operate well on uneven terrain and are incapable of close approach to tree trunks. Hand guided motor driven nut gathering machines have been proposed to overcome the deficiencies, complexity and high cost of the large machines. The hand guided machines have not proven practical or commercially acceptable for a variety of reasons. In the first place they have not been sufficiently compact and maneuverable so that one man walking behind the machine can easily control it. They have not been able to pick up nuts lying close to tree trunks on uneven ground. The nuts picked up are not easily gathered and unloaded. Their nut collecting receptacles are located in awkward places difficult to reach for unloading. The rigidity of their construction has prevented operation on very rough and uneven terrain. They use large heavy motors which unbalance the machines on uneven ground and reduce maneuverability. Their heavy weight crushes nuts lying on the ground over which they pass. They pick up excessive amounts of debris, grass, twigs and other undesirable foreign matter.

The present invention is directed at overcoming the above and other difficulties and disadvantages of prior nut harvesting machines, both those of the large complex power driven type and those of the hand guided motor driven type.

According to the invention there is provided a nut gathering or harvesting machine adapted for gathering nuts from an uneven ground surface. The machine is compact and so maneuverable that it can easily be controlled by one man walking behind the machine. The machine is capable of gathering nuts from the ground surface immediately adjacent tree trunks. For this purpose the machine is provided with means for picking up nuts from the ground from points located at the forward extremity of the machine. The machine is so balanced that the forward end of the machine can be readily guided near tree trunks. The nuts can be easily and rapidly unloaded from the machine. This feature is accomplished by providing a nut receiving sack or receptacle at an unobstructed rear portion of the machine. The filled sack can be easily and quickly removed from the machine, emptied and replaced. The machine is adapted for operation over rough terrain by providing a plurality of nut harvesting units at the forward end of the machine. Each unit operates independently of the other. All are arranged for up and down movement and for tilting from side to side as the machine moves over uneven terrain. The machine is basically simple in structure. It employs a small motor and avoids use of complex gearing and parts operating at very high speeds. All this minimizes maintenance and operating expense. The machine is so constructed that it can be propelled by a separate motor driven vehicle if desired.

Other and further features, objects and advantages of the invention will become apparent from the following detailed description taken together with the drawings, wherein:

FIG. 2 is a top plan view of the machine.

FIG. 3 is a side view of the machine.

FIG. 4 is an enlarged fragmentary perspective view showing a joint for connecting a nut harvesting unit to a frame of the machine.

FIG. 5 is an enlarged top plan view of a portion of a nut harvesting unit.

FIG. 6 is a cross sectional view taken on line 6—6 of FIG. 5.

FIG. 7 is a fragmentary sectional view taken on line 7—7 of FIG. 5.

Figure 1:
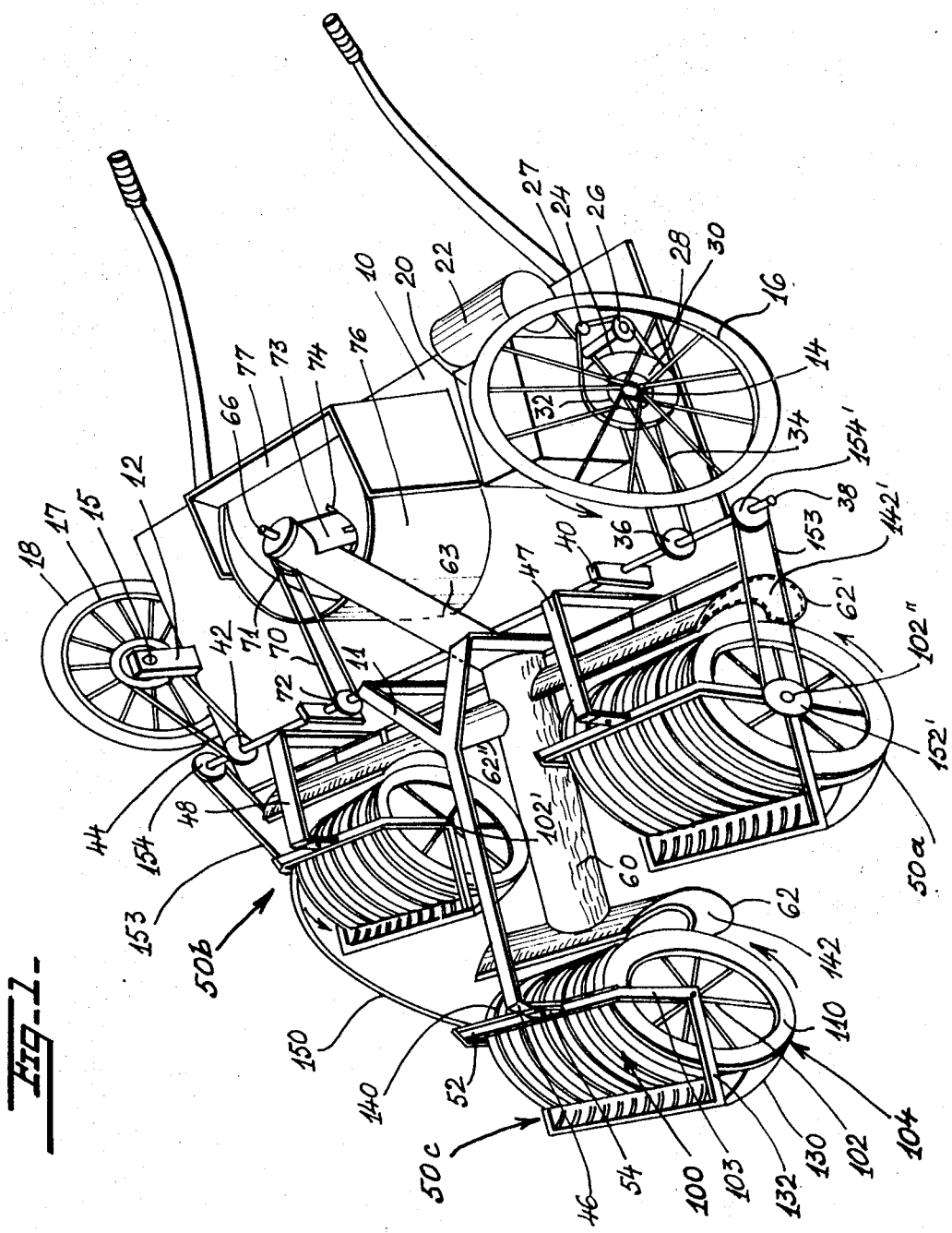
FIG. 1 is a perspective view of a nut harvesting machine embodying the invention.

Referring to the drawing, the machine includes a carriage comprising horizontal platform 10. On the platform are upright posts 12 carrying axles 14, 15 on which are rotatably mounted light wheels 16, 17 having pneumatic tires 18. On the platform is motor 20. This motor can be electrically driven by batteries or it can be an internal combustion engine provided with a fuel tank 22. The motor has a drive shaft 24 carrying a driving pulley 26. Entrained on this pulley and on idler pulley 27 is a belt 28 engaged on a driven pulley 30. Pulley 30 is mounted on axle 14. Another pulley 32 on axle 14 engages another belt 34 which drives a pulley 36 on cross shaft 38. Shaft 38 is supported and journaled in bearings carried by upright posts 40 on platform 10. Another pulley 42 on shaft 38 engages another belt 44 entrained on a pulley 46 mounted on axle 15. When the motor is running belt 28 drives wheel 16, shaft 38 and wheel 17. The wheels are light in weight being provided with wire spokes connected to hubs rotatably mounted on axles 14, 15.

Shaft 38 is mounted forwardly of the motor and wheels 16, 17 near the front edge of platform 10. Also mounted on the platform is a framework including frame bars 47, 48, and 49. Frame bars 47 and 48 support two lateral nut gathering units 50a, 50b. Frame bar 49 supports a front, centrally located nut gathering unit 50c.

Each of the units 50a, 50b and 50c includes a vertical inverted rectangular U-shaped frame 52. A rectangular sleeve 54 extends upwardly from the top of frame 52 as best shown in FIG. 4. A depending end portion 46 of each frame bar 47, 48 and 49 is disposed in a sleeve 54. The sleeve is loosely fitted. A bolt 56 extends through holes in opposing sides of sleeve 54 and through a slot 58 in end portion 46 of the frame bar. By this arrangement the sleeve and frame 52 can move vertically and tilt laterally with respect to the supporting frame bars 47, 48 and 49. Frame bar 49 is Y-shaped in plan view and extends forwardly of units 50a and 50b. Frame bar 49 is centered over a tubular conduit 60 supported on platform 10. At its forward end conduit 60 supports a trough 62 which opens into the front end of the conduit and forms part of unit 50c. At its rear end the conduit has an upwardly inclined section 63 in which is a helical conveyor blade 64. The conveyor blade is rotatably supported by shaft 66 connected by gearing to a pulley 71. Belt 70 on pulley 71 is driven by pulley 72 on shaft 38. At its upper end the conduit section 63 opens into a downwardly extending nozzle 73 having hooks 74 upon which a sack 75 can be hung for collecting nuts. A shield 76 is mounted on a platform 10 to surround the area where the sack is hung. A removable back or cover plate 77 can be mounted to close the shield at the rear end of the platform.

The trough 62 of unit 50c is curved with its concave side facing forwardly toward a wheel assembly 100 also forming a part of unit 50c. The wheel assembly 100 includes a horizontal shaft 102 connected to depending lateral arms 103 of frame 52. On shaft 102 as best shown in FIGS. 5, 6 and 7 is a plurality of wheels 104, 105, 106 and 107. The outermost wheels 104 at opposite ends of the shaft each includes a single ring 110 which is wide in the radial direction; see FIG. 7. Flexible wire spokes 112 connect ring 110 to a hub 114 on shaft 104. Adjacent to wheels 102 are outer spacer rings 116 and inner spacer sleeves 118. Adjacent sleeves 118 are wheels 105. Adjacent wheels 105 are smaller spacer sleeves 120. Adjacent sleeves 120 are wheels 106. Adjacent wheels 106 are further long sleeves 118'. Adjacent sleeves 118' are wheels 107. The shaft carries a plurality of sets of sleeves 118, 118', 120 and wheels 105, 106 and 107 on shaft 102. The spaces D, D' and D'' between wheels 104 and 105, between wheels 106, 107 and between wheels 107, 105 are all slightly less than that of the minimum width of a nut to be picked up by the machine. Each of the inner wheels 105, 106 and 107 includes concentric radially spaced outer and inner rings 125, 126 secured to flexible wire spokes 128; see FIG. 6. Due to the flexibility of spokes 112 and 128, nuts being harvested can be engaged between rings 125 and 126 of adjacent wheels. The wheels 105, 106 are closely spaced by shorter sleeves 118 so that nuts cannot enter between these wheels.

Aligned with the wheels 105, 106 and 107 in unit 50c are drag fingers or tines 130 carried on the forward end of a horizontal U-shaped frame 132 secured to lower ends of frame bars 103. These fingers curve rearwardly and downwardly toward the ground and serve to align nuts lying on the ground with spaces D, D' and D'' between the wheels spaced apart by sleeves 118, 118'. Further curved tines or fingers 140 are mounted on frame 52 of unit 50c and extend rearwardly and downwardly between the wheels 104-107. These fingers serve to expel nuts engaged between the rings of wheels 104-107 into trough 62. The outer ends of the trough are closed by walls 142.

The wheel gathering units 50a and 50b are similar to those of unit 50c so that the above description of unit 50c will in general suffice for units 50a and 50b. The troughs 62' and 62'' of units 50a and 50b are secured at lateral inner ends to side openings in conduit 60. The outer ends of the troughs 62' and 62'' are closed by walls 142'; see FIG. 3.

The cross shaft 102' of unit 50b is coupled to cross shaft 102 by a flexible shaft 150 to turn the wheels of unit 50a. Shaft 102' carries a pulley 152 on which is engaged a belt 153 entrained on a drive pulley 154 on the cross shaft 38. Unit 50c includes a pulley 152' on shaft 102''. This pulley and a pulley 154' on shaft 38 are entrained by a belt 153'. By this arrangement the wheels of all units 50a, 50b and 50c are simultaneously driven along with wheels 16 and 17 when the motor is running. The motor is provided with conventional controls (not shown) which may be mounted on one or both handlebars 160 secured to the forward end of platform 10.

In operation of the machine, the operator will walk behind the machine holding handlebars 160. As the machine moves forward the lower fingers 130 align the nuts with the spaces between the wheels of the wheel assemblies 100. The nuts N indicated in FIG. 3 become engaged between the rings of wheels 104-107 and travel upwardly with the wheels until the fingers 140 are encountered whereupon the nuts (as nut N' in FIG. 3) are expelled into troughs 62, 62' and 62''. The troughs and conduit 60 are angled slightly downwardly and vibrate somewhat during operation of the motor so that the nuts pass out of the troughs into the conduit and through the conduit to the conveyor blade or vane 64 in conduit 63. The nuts are then carried up to the discharge nozzle 73 and drop into sack 75 suspended from hooks 74. While the machine moves forward, the units 50a, 50b, 50c move up and down or tilt laterally when uneven ground is encountered. This is made possible by the joint structure shown in FIG. 4. All units are directly driven via belts and pulleys from the motor. This makes the machine highly maneuverable and easy to handle.

Although the machine is particularly arranged for manual guidance by an operator walking behind the machine, it is also possible to provide a seat on platform 10 so that the operator can ride. If a smaller unit is desired the lateral units 50a and 50b can be omitted leaving only the single unit 50a. It is also possible to operate the machine without the motor. In such operation, the operator will push the machine along the ground surface. The turning of wheels 16, 17 will in turn rotate shaft 38 via belt 34 to drive the nut gathering units 50a, 50b and 50c or any lesser number of units. For some machines it may be possible to substitute a helical wire coil in place of the wheels 104-107 in each nut gathering unit.

Other and further modifications can be made as will readily occur to those skilled in the art. However it will be understood that the invention encompasses all such modifications as come within the scope of the claims.

What is claimed is:

1. A nut harvesting machine, comprising carriage means for advancing along a ground surface from which nuts are to be gathered; conveyor means carried by the carriage means for conveying to a receptacle nuts picked up from the ground surface; a framework carried by the carriage means and at least one nut gathering unit connected to said conveyor means for picking up nuts from the ground surface and passing the picked up nuts to the conveyor means, said nut gathering unit comprising a plurality of laterally spaced axially aligned wheels rotatably carried by the framework and movable along the ground, a first plurality of spaced tines carried by said framework forwardly of the wheels and arranged to align nuts on the ground with spaces between the wheels so that the nuts are engaged between the wheels as the tines pass the nuts on the ground, a second plurality of spaced tines carried by said framework and arranged to expel nuts engaged between the wheels as the wheels rotate, and a trough connected to said conveyor means and arranged to collect nuts expelled from the wheels by the second tines and to pass the collected nuts to said conveyor means, whereby the nuts passed to the conveyor means are conveyed to said receptacle.

2. A nut harvesting machine as defined in claim 1, further comprising motor means carried by carriage means and arranged to propel the same along the ground surface; and transmission means operatively connecting said motor means with said unit and conveyor means to drive the same simultaneously so that nuts are continuously picked up by the wheels and passed to the conveyor means while said carriage means and nut gathering unit advance along the ground surface.

3. A nut harvesting machine as defined in claim 1, wherein said framework comprises loosely jointed frame members arranged to permit the unit to ride up and down and tilt laterally while the wheels pass over uneven portions of the ground surface picking up nuts therefrom.

4. A nut harvesting machine as defined in claim 1, wherein said carriage means comprises a horizontal platform, and other wheels located rearwardly of said unit and rotatably connected to the platform to advance the same over the ground surface.

5. A nut harvesting machine as defined in claim 1, wherein said wheels each comprises a pair of concentric coplanar rings, a hub, and a plurality of flexible spokes connecting the hub and rings, said unit further comprising a shaft carried by the framework and extending through the hubs of all the wheels, the lateral spacing of the wheels being slightly less than the minimum width of nut to be engaged in the spaces between the wheels.

6. A nut harvesting machine as defined in claim 1, wherein said carriage means comprises a horizontal platform, said conveyor means extending upwardly over the platform and rearwardly of said unit, said conveyor means having an elevated discharge end for discharging gathered nuts into said receptacle over the platform.

7. A nut harvesting machine as defined in claim 1, further comprising hand guiding means connected to said carriage means for guiding said unit along the ground surface.

8. A nut harvesting machine as defined in claim 1, further comprising at least one other nut gathering unit similar to the first named nut gathering unit and connected to the conveyor means for picking up nuts from the ground surface and passing the same to the conveyor means.

9. A nut harvesting machine as defined in claim 8, further comprising motor means carried by said carriage means and arranged to propel the same along the ground surface; and transmission means operatively connecting said motor means with said conveyor means and with wheels of both units to drive the same simultaneously so that nuts are continuously picked up by the wheels of both units and passed to the conveyor means while the carriage means and nut gathering units advance along the ground surface.

References Cited
UNITED STATES PATENTS

| | | | |
|---|---|---|---|
| 2,365,540 | 12/1944 | Fonken | 214—356 |
| 2,413,679 | 1/1947 | Binder | 214—356 |
| 2,441,244 | 5/1948 | Kimball | 56—328 R |
| 2,658,637 | 11/1953 | Bailey | 214—356 |
| 3,102,647 | 9/1963 | Bonney | 214—356 |

RUSSELL R. KINSEY, Primary Examiner

U.S. Cl. X.R.

214—356